United States Patent [19]
Jevremov

[11] 3,936,945
[45] Feb. 10, 1976

[54] DIAL GAUGE MEASURING DEVICE

[76] Inventor: Milan P. Jevremov, 2515 Lawnshire Drive, Copley, Ohio 44321

[22] Filed: June 6, 1974

[21] Appl. No.: 476,926

[52] U.S. Cl. ............................. 33/172 R; 33/169 B
[51] Int. Cl.² ............................................ G01B 3/28
[58] Field of Search .......... 33/169 R, 169 B, 172 R, 33/170, 143 R, 164 R, 164 D, 33/147 R, 167, 168

[56] References Cited
UNITED STATES PATENTS

| | | | |
|---|---|---|---|
| 2,207,396 | 7/1940 | Edelen | 33/170 |
| 2,478,677 | 8/1949 | Brocklin, Jr. | 33/170 |
| 2,663,946 | 12/1953 | Wojcik | 33/172 R |
| 2,667,700 | 2/1954 | Pistoles | 33/169 B |
| 3,016,619 | 1/1962 | Mueller | 33/172 R |
| 3,192,635 | 7/1965 | Miles | 33/170 X |

*Primary Examiner*—William D. Martin, Jr.
*Attorney, Agent, or Firm*—Hamilton, Renner & Kenner

[57] ABSTRACT

The invention described herein relates to a device for use with measuring instruments having a movable plunger, such as dial gauge indicators. The device includes a body carrying a slidable member, a shoulder element movable within the body and a suitable means for mounting the body to the measuring instrument. In operation, selective movement of the slidable member limits the amount of plunger travel to a fixed distance. The device may be utilized with different adapters to vary the measuring capabilities of the instrument and at least one novel adapter is described herein.

14 Claims, 10 Drawing Figures

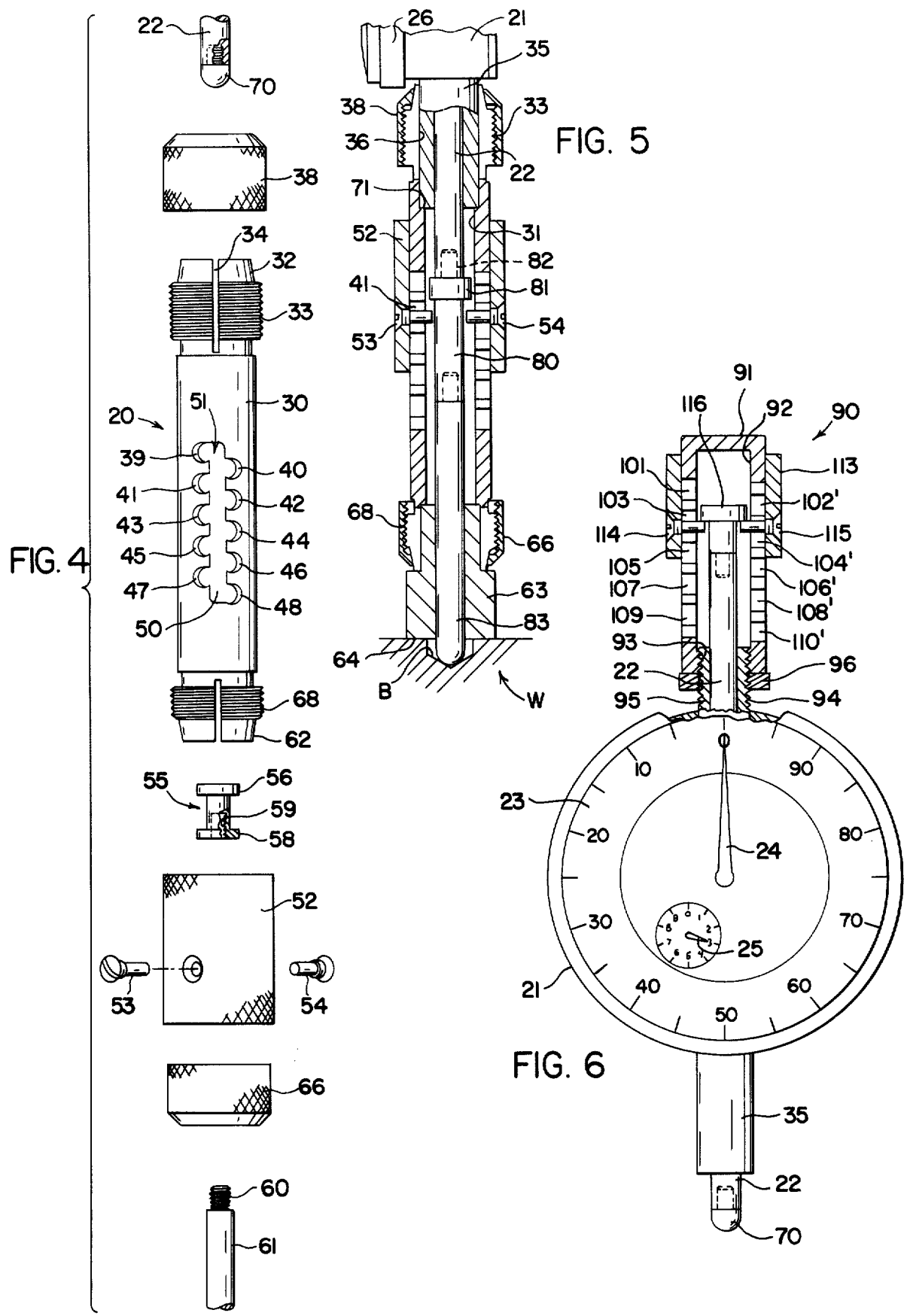

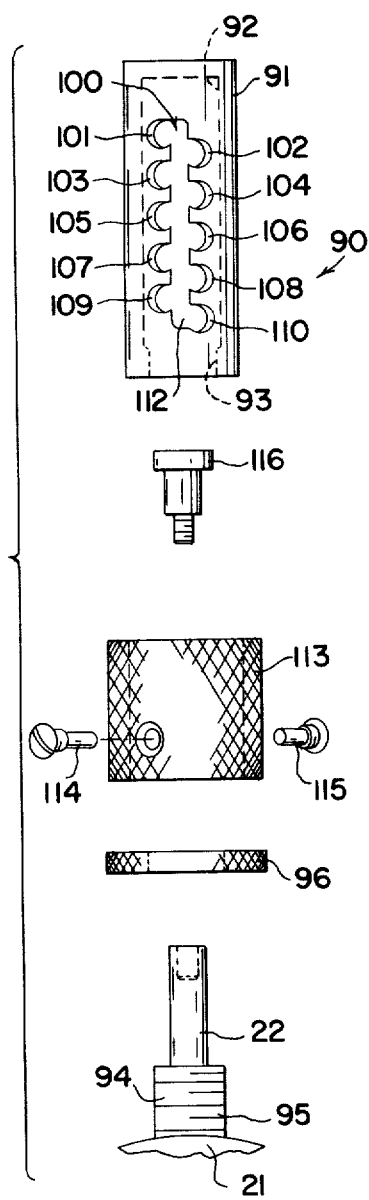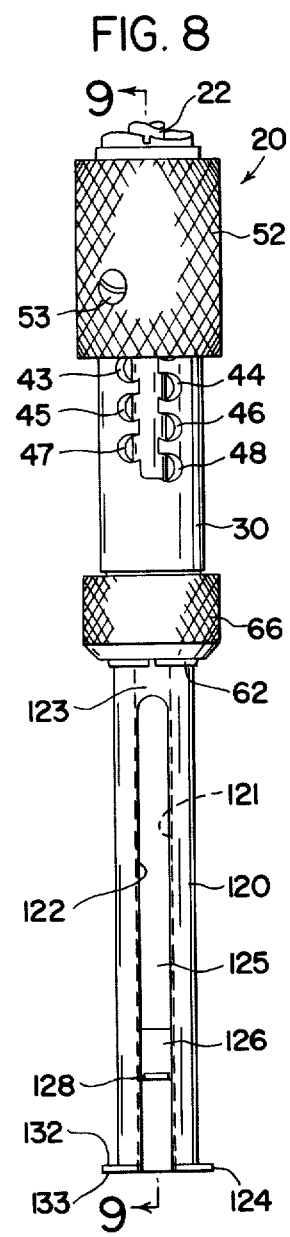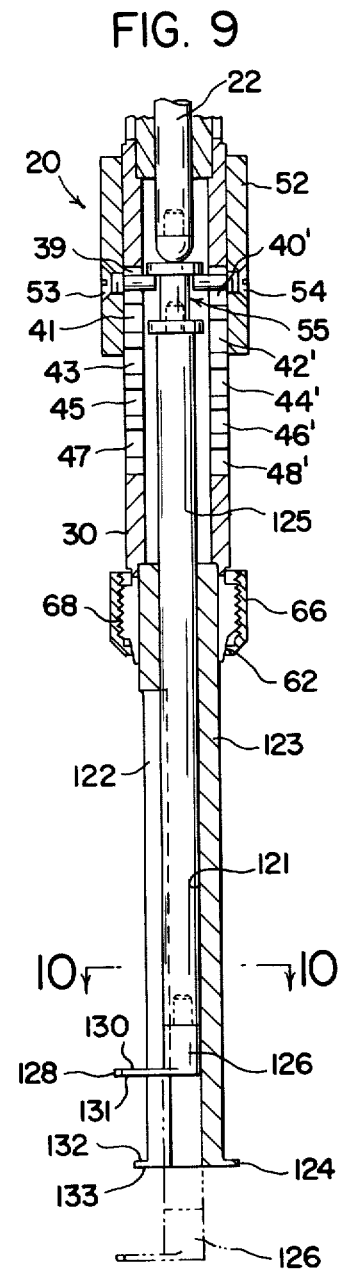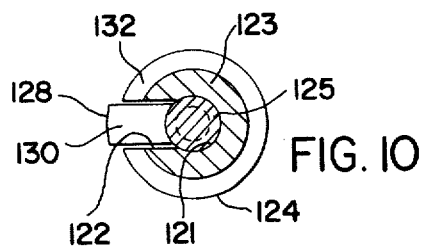

DIAL GAUGE MEASURING DEVICE

BACKGROUND OF THE INVENTION

This invention relates to a device which is interposable between a dial gauge indicator and a workpiece to facilitate the taking of a plurality of similar measurements. The device readily receives various adapters for making measurements similar to those depicted in U.S. Pat. Nos. 3,101,551 and 3,225,447, to I. E. Bryant, thereby increasing the measuring capabilities of the dial gauge indicator.

Dial gauge indicators are precision measuring instruments well known among machinists. A typical gauge has a face divided into one hundred increments, an indicator plunger which is movable into the gauge a distance of one inch, and, a dial or pointer which indicates movement of the plunger on the face. The dial completes one revolution on the face of the gauge for every one-tenth inch of plunger movement to enable the user to measure one-thousandth of an inch or less. A second, smaller dial, is often employed with a scale indicating tenths of an inch to count revolutions of the main dial when measuring distances exceeding one-tenth of an inch.

Although the foregoing dial gauges are widely used by machinists, it is often bothersome to watch both dials to determine measurement to the nearest tenth of an inch before taking the precise measurement to the desired thousandth of an inch. Moreover, the internal mechanism of these gauges are relatively delicate and it has been experienced that repeated thrusting of the plunger a distance of several tenths of an inch or more can cause undue wear of the gauge reducing its accuracy and eventually its useful life. For example, in the measurement of a one-half inch bore, the dial is driven around the face between four or five revolutions before the actual measurement may be taken. If a plurality of these measurements are repeatedly made, such as by an inspector, the gauge is subjected to at least four unnecessary revolutions of the dial per use.

By employing the device described hereinbelow, it is possible to adjustably preselect and maintain a single one-tenth inch increment within which to take a plurality of similar measurements, i.e., in the above instance the gauge would be set to measure between 0.4 inches and 0.5 inches and at rest would not indicate less than 0.4 inches. Devices which purport to perform a similar function have been described in U.S. Pat. Nos. 2,667,701, to A. G. Davis, and 3,192,635, to C. E. Miles. However well these devices may in fact operate, it is believed that the preferred embodiments set forth herein represent a new and novel improvement in the art.

SUMMARY OF THE INVENTION

It is therefore an object of the present invention to provide a device usable with a dial gauge indicator which can be readily adjusted to limit the amount of movement of the indicator plunger to a desired range, less than the total distance of which the gauge is capable of measuring.

It is another object of the present invention to provide a device usable with a dial gauge indicator and which is capable of receiving a variety of adapters for taking measurements on different types of workpieces.

It is a further object of the present invention to provide a device usable with a dial gauge indicator and having a minimum number of components enabling it to be readily manufactured and easily operated.

It is yet another object of the present invention to provide a device usable with a dial gauge indicator which will prevent undue wear of the gauge.

It is still another object of the present invention to provide a device usable with a dial gauge which will permit the user to take a measurement much faster than with existing equipment.

These and other objects of the present invention, together with the advantages thereof over existing and prior art forms which will become apparent from the following description, are accomplished by the means hereinafter described and claimed.

In general, the device is usable with measuring instruments having a movable plunger such as a dial gauge indicator and includes a body carrying a slidable member, a shoulder element movable within the body, and a means for mounting the body to the measuring instrument. The body has a bore extending throughout its length which receives the plunger from the measuring instrument. A plurality of notches extend through at least one wall of the body and commmunicate with the bore. The slidable member engages at least one of the notches and a portion thereof supports the shoulder member carried within the bore. Movement of the plunger, which rests upon the shoulder member is limited to a desired fixed distance as selected by the position of the slidable member on the body.

The device may be mounted for use with a dial gauge indicator in two positions and by substituting various shoulder elements it is possible to vary the distance of travel of the indicator plunger. The device may be further modified by its use with adapters to permit various type of measurements to be made. At least one novel type of adapter is disclosed herein.

BRIEF DESCRIPTION OF THE DRAWINGS

FIG. 4 is an exploded elevational view of the components comprising the preferred form of deivce;

FIG. 5 is a cross sectional view similar to FIG. 2 depicting an alternative form of shoulder member;

FIG. 6 is a front elevation similar to FIG. 1 depicting the device mounted in an alternate position;

FIG. 7 is an exploded elevational view of the components as utilized in the embodiment depicted in FIG. 6;

FIG. 8 is a front elevation of the device coupled with a novel adapter for taking different measurements;

FIG. 9 is a cross section taken substantially on line 9—9 of FIG. 8 depicting movement of the foot in relation to the anvil of the adapter; and, FIG. 10 is a cross section taken substantially on line 10—10 of FIG. 9 depicting the position of the foot within the adapter.

DESCRIPTION OF THE PREFERRED EMBODIMENTS

Figure 1:
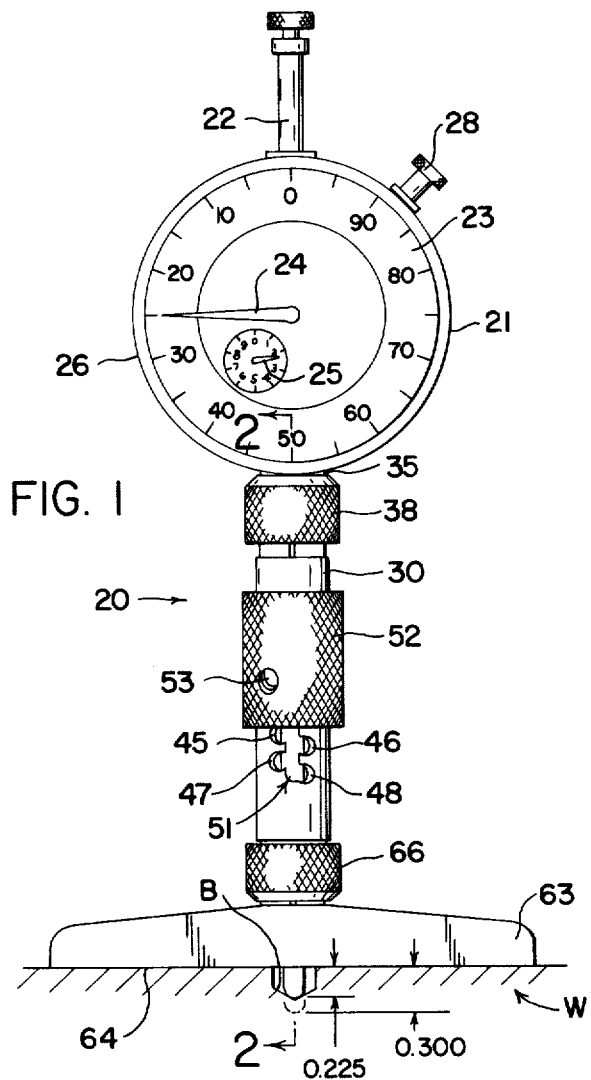
FIG. 1 is a front elevation of a preferred form of the device as utilized with a dial gauge indicator and depicting measurement of a workpiece.

The device indicated generally by the numeral 20 is described in conjunction with a conventional dial gauge indicator 21 having an indicator plunger 22 passing through the upper and lower surfaces of the gauge. As it typical, the gauge 21 has a face 23 divided into one hundred increments or other suitable number, a primary pointer 24, capable of one or more revolutions about the face 23, and a secondary pointer 25, which records the revolutions of the pointer 24 as the indicator plunger 22 passes downwardly through the gauge 21. In order to clearly describe the operation of the device 20 it is to be understood that the gauge 21 is capable of measuring a distance slightly in excess of 1.000 inch to the nearest 0.001 inch. Thus, each revolution of the pointer 24 indicates movement of the plunger equal to 0.1 inch, and the numerals 10–90 on the face 23 indicate movement equal to 0.01 inch. In normal rest position, the plunger 22 extends down through the gauge a distance of 1.000 inch and, to "zero" adjust the gauge 21, the dial face 23 can be moved by rotating an outer ring 26 until the 0 is positioned beneath the pointer 24 when the latter is at rest. Thereafter, a locking screw 28 can be tightened to maintain the face 23 in a fixed position.

Figure 2:
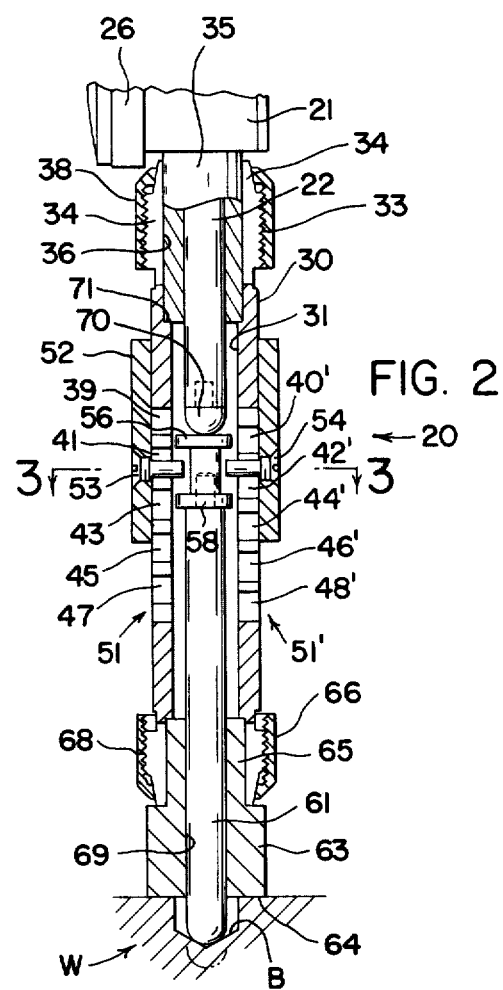
FIG. 2 is a cross section taken substantially on line 2—2 of FIG. 1 depicting the internal structure of the device.
Figure 3:
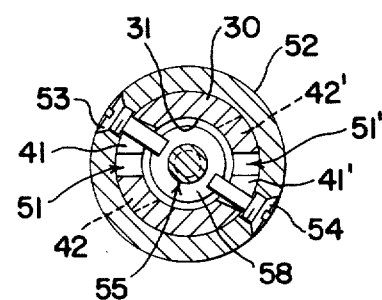
FIG. 3 is a cross section taken substantially on line 3—3 of FIG. 2 depicting the relationship of the sliding member with the shoulder member.

The basic structural components of a preferred embodiment of the device are most clearly depicted in FIG. 4. The device 20 includes a body portion 30 which comprises a generally cylindrical barrel having a longitudinally extending bore 31 therethrough which partially houses the plunger 22. The body 30 and remaining components are preferably constructed of metal for durability, although certain plastics or other materials may be suitable. The upper end 32 of the body 30 may carry a tapered external thread 33 and one or more axial slots 34 for coupling the device 20 to the dial gauge 21. As depicted in FIG. 2, the gauge 21 has a cylindrical extension or leg 35 which is received within a bore 36 in the body 30. A knurled ring 38 engages the threaded portion 33 which, when tightened, will cause the bore 36 to frictionally engage the leg 35. Of course, equivalent fastening means could be employed as desired by the manufacturer so long as the gauge 21 is vertically adjustable within the bore 36.

In the side wall of the body 30 is a plurality of notches 39–48, which as seen in the drawings, are longitudinally oriented in an alternating or staggered fashion on both sides of and communicating with an elongated slot 50, hereinafter collectively referred to as the adjustment slot, indicated generally by the numeral 51. The body 30 may be provided with a second adjustment slot 51', similar to and opposite the slot 51, although it is to be understood that one such slot 51 will suffice. Furthermore, the number of notches 39–48, equals ten, corresponding to 0.1 inch increments on the dial gauge 21; however, it is within the scope of this invention to employ other suitable series of notches, e.g., five or twenty. For convenience, scribings (not shown) could be applied to the side wall of the body 30 to aid the user in determining the incremental range selected without the need for concurrent reference to the dial gauge.

A sleeve or sliding member 52 rotatably communicates with the body 30 and is provided with a screw 53 which extends through the side wall thereof, through the adjustment slot 51, and into the central bore 31 of the body 30. A second screw 54 may be employed to engage the adjustment slot 51'. A small spool-shaped shoulder element 55, having upper and lower flanges, 56 and 58, respectively, separated by a generally cylindrical neck, is positioned within the bore 31 and is generally maintained therein by the screws 53 and 54 as depicted in FIG. 2. The shoulder element 55 may have an internally threaded bore 59 passing through the lower flange 58 for receiving the upper threaded end 60 of a plunger extension 61. Although the shoulder element 55 and plunger extension may be one continuous member, greater measuring capabilities are available utilizing a removable extension 61 as will become apparent below.

The plunger extension 61 may be a fixed distance such as 1.000 inch below the lower end 62 of the body 30, or below an adapter such as 63, for reposing against a workpiece indicated generally by the letter W. The adapter 63 is a bar-shaped member, having a broad flat underface 64, which will traverse a larger bore than would the lower end 62 of the body 30. The adapter 63 has an axial leg 65 and is readily coupled to the device 20, via knurled ring 66 and threaded surface 68, in the same manner as the device 20 is coupled to the gauge 21. The plunger extension 61 passes freely through a bore 69 in adapter 63.

The sliding member 52 is movable along the body 30 when the former is rotated so that the body of screw 53 is within the elongated slot 50 and the body of screw 54 is within the elongated slot 50'. The shoulder element 55, being confined in position by the ends of screws 53 and 54, then travels with the sliding member 52. When the device 20 is coupled to the gauge 21, the indicator plunger 22, having a removable tip 70, rests against the upper flange 56 of shoulder element 55 and movement of the sliding member 52 upwardly along the body 30 will retract the plunger 22. By rotating the sliding member 52 a few degrees to the right or to the left, the screws 53 and 54 will engage one of the nearest notches, 39–48 and 39'–48' respectively. Further downward movement of the plunger 22, shoulder element 55 and plunger extension 61 ceases, as the upper flange 56 now contacts the screws 53 and 54.

Utilizing the above described gauge 21, for measuring up to 1.000 inch as exemplary, each of the alternating notches 39–48 and 39'14 48' is spaced at an interval of 0.1 inch from the opposite notch. Thus, when the screw 53 engages notch 48; the plunger 22 is extended a distance of 1.000 inch, as is the plunger extension 61 from the flat undersurface 64 of the adpater 63. Both pointers 24 and 25 should rest on 0 and a shoulder 71 between bores 31 and 36 may be provided to facilitate this objective during assembly.

With reference now the shoulder element 55, the preferred distance between the upper and lower flanges, 56 and 58, respectively, is 0.1 inch. Thus, upward movement of the plunger extension 61 is limited to 0.1 inch, i.e., the distance of travel when the lower flange 58 of the shoulder element 55 contacts the screws 53 and 54. The dial gauge 21 is therefore limited to measuring a 0.1 inch increment from 1.000 inch to 0.9 inch.

In FIGS. 1 and 2, the slide 52 has been moved upwardly on the body 30 and then rotated until the screw 53 rests within the notch 41 (the screw 54 will also rest within a notch 41' not shown in the drawings). At this position, the indicator plunger 22 is extended 0.3 inch, the tip 70 is urging the flange 56 against the screws 53 and 54 and, the plunger extension 61 is extended 0.3 inch below the undersurface 64 of adapter 63, as depicted in phantom in the drawings. When the adapter 63 is placed over the workpiece W, a bore B, having a depth greater than 0.2 inch and less than 0.3 inch, e.g., 0.225 inch, can be readily measured. Without the use of the device 20, the indicator plunger 22 would travel 0.7 inch, or seven revolutions of the pointer 24, for each bore B that is measured.

It should be apparent that if one desired to measure a bore having a depth greater than 1.000 inch, e.g., 1.500 inch, 2.750 inch, 4.625 inch, etc., plunger extensions 61 of various lengths could be employed, the slide 52 being set to the nearest 0.1 inch as in the foregoing example. Also, the increments of measure could be varied by substituting various shoulder elements 55, differing as to the space between flanges 56 and 58.

A slight variation of a shoulder element is depicted in FIG. 5, wherein the shoulder 80 has an upper flange 81 but no lower flange. A small extension 82 from flange 81 may be threadably connected to the indicator plunger 22, by the removal of the tip 70 from the latter or, if the tip 70 is employed, the flange 81 will be flat. The shoulder element 80 may extend a distance beyond the lower end of the body 30, or it may be provided with an extension 83, similar to the extension 61.

Utilizing the same example as presented hereinabove, the slide 52 has beem moved so that the screw 53 rests in notch 41, and screw 54 is in notch 41' wherein the plunger extension 83 extends a distance of 0.3 inch below the undersurface 64 of adpater 63. In this instance the plunger 22 and extension 83 can travel a total distance of 0.3 inch, between 0.300 inch and 0.000 inch.

In FIG. 6, an alternative embodiment is depicted wherein a modified form of the device, indicated generally by the numeral 90, is coupled to the top of the dial indicator gauge 21. Although not depicted in the drawing, an adpater such as 63 or the like could also be coupled to the gauge extension 35 in a suitable manner. The modified device 90 includes a body 91 comprising a generally cylindrical barrel having a longitudinally extending bore 92 therein which receives the upper end of the indicator plunger 22. The lower end of the body 91 carries an internal thread 93, joining the bore 92, which engages an external mating thread 94 on an upper leg 95 extending from the gauge 21. A lock ring 96 is threadably interposed between the gauge 21 and device 90.

The body 91 has an adjustment slot, indicated generally by the numeral 100, comprising ten notches 101–110, which communicate with an elongated slot 112, similar to the arrangement described in conjunction with the device 20. A second adjustment slot 100' (not shown) may be provided in the opposing body wall, having notches 101'–110' communicating with an elongated slot 112'. A sliding member 113 is also provided having a screw 114 engaging the slot 100 and a screw 115 engaing the slot 100'. Both screws 114 and 115 extend partially into the bore 92 in the body 91. The cap screw 116, which customarily is provided on a gauge 21, may be employed as the shoulder element of the device 90 or, if desired, a spool shaped element, similar to shoulder element 55 having upper and lower flanges could be substituted.

To assemble the device 90 and couple it to the gauge 21, the lock ring 96 and body 91 are threaded onto the upper leg 95. The sliding member 113 is then positioned around the body 91, toward the lower end thereof, and the screws 114 and 115 are threaded into the walls of member 113 so as to engage the underside of cap screw 116. In this position, as the sliding member 113 is raised on body 91, the cap screw 116 and indicator plunger 22 will travel away from the gauge 21. Upon rotation of the member 113 to the left or right, to engage the screws 114 and 115 within a notch in the slots 100 and 100', downward movement of the plunger to its rest position will be selectively terminated.

In FIG. 6, the screw 114 engages notch 103 while the screw 115 engages notch 103' (not shown) and the plunger 22 is extended a distance of 0.300 inch from the lower leg 35 of the gauge 21. Further travel of the indicator plunger 22 will be between the dimensions 0.300 inch and 0.000 inch, unless a spool shaped shoulder element is employed, in which case travel could be limited to 0.1 inch or other suitable increment.

By rotating the entire device 90 upon the threaded leg 95 it is possible to further limit the extent of plunger travel. For example, the slide 113 may be used to set the plunger depth to 0.300 inch. Then by unscrewing the device 90, 0.050 inch, as will be readily observable by the pointer 24, measurements may be taken between the dimensions 0.250 inch and 0.000 inch. Utilizing a spool shaped shoulder element, having a space of 0.1 inch between flanges, the increment of measure can be lessened to any desired extent such as 0.020 inch or 0.010 inch by unscrewing the device. Of course, the device 90 can be readily "zero" adjusted by rotation in the latter direction and, whenever a desired location is found, the lock ring 96 may be rotated against the body 91.

In addition to the adapter 63, previously described in conjunction with the device 20, an elongated barrel 120 may be substituted therefor. With references to FIGS. 8–10, the barrel 120 is depicted, having an internal bore 121 extending longitudinally therethrough, and a milled straight slot 122 extending through one side wall to the bore 121 as well as along most of the length thereof. The slot 122 terminates short of the upper end 123 of barrel 120 which is received within the lower end 62 of device 20 and frictionally engaged therein upon tightening of the knurled ring 66. The lower, opposite end of barrel 120 terminates in a flat disc or anvil 124 also provided with the bore 121 and slot 122.

An elongated plunger extension 125 is threadably connected at its upper end to the shoulder element 55, and at its lower end bears an internally threaded portion for receiving a tip 126 having a radially extending foot 128 which is dimensioned so as to travel freely within the slot 122. The radius of the foot 128 as depicted is greater than that of the disc 124, although a radius of equal or lesser extent could be utilized. In use, a variety of measurements may be taken from the inner and outer surfaces, 130 and 131, respectively, of the foot 128, to the inner and outer surfaces, 132 and 133, respectively, of the disc 124, and barrels and extensions of various lengths may be readily substituted. Possible measurements include axial distances within internal bores such as grooves, rings for seals, and the thicknesses thereof. Unlike many prior art devices, wherein the extension 125 is also provided with a disc, the particular combination taught herein of a milled slot and a foot slidable therein, will enable the skilled machinist to take measurements more readily and accurately.

It is to be understood that with either device 20 or 90, the adpater 63 could be coupled with an elongated barrel and plunger combination, 120 and 125, in any suitable manner, wherever such an arrangement would enable the user to take a desired measurement. Moreover, other known adapters capable of being coupled with the device may be readily employed.

Thus, it should be evident that the disclosed device carries out the objects of the invention set forth above. As apparent to those skilled in the art, modifications can be made without departing from the spirit of the invention herein disclosed and described, the scope of the invention being limited solely by the scope of the attached claims.

What is claimed is:

1. A device for use with measuring instruments including dial gauge indicators and the like which have a movable plunger for determining dimensions of a workpiece, comprising:
    a body member having a bore therethrough receiving the plunger and further having an adjustment slot extending through at least one wall thereof and communicating with said bore;
    means for mounting said body member to the measuring instrument;
    a sliding member carried on said body member over said adjustment slot; and,
    shoulder means, engageable with said sliding member for supporting the plunger whereby movement of the plunger is limited to a fixed distance as determined by the position of said sliding member on said body member.

2. A device for use with measuring instruments, as described in claim 1, wherein said adjustment slot comprises:
    an elongated slot; and,
    a plurality of notches longitudinally oriented in an alternating fashion on opposite sides of said elongated slot.

3. A device for use with measuring instruments, as described in claim 2, wherein said body member has two said adjustment slots in opposite walls.

4. A device for use with measuring instruments, as described in claim 2, wherein said sliding member comprises:
    a rotatable sleeve having a screw mounted in a side wall thereof passing through said adjustment slot and extending into said bore.

5. A device for use with measuring instruments, as described in claim 4, wherein said screw selectively engages one of said notches in response to vertical movement of said sliding member upon said body and rotation thereof.

6. A device for use with meausuring instruments, as described in claim 1, wherein said shoulder means comprises:
    a generally cylindrical neck moveable within said bore having an upper flange and wherein said shoulder means communicates with the end of the movable plunger.

7. A device for use with measuring instruments, as described in claim 6, wherein said shoulder means further includes
    a lower flange at a fixed distance below said upper flange.

8. A device for use with measuring instruments, as described in claim 4, wherein said shoulder means comprises:
    a generally cylindrical neck movable within said bore, having an upper flange, wherein said shoulder means communicates with the end of the movable plunger, movement of said upper flange being limited by said screw extending into said bore.

9. A device for use with measuring instruments, as described in claim 8, wherein said shoulder means further includes
    a lower flange at a fixed distance below said upper flange, movement of said lower flange being limited by said screw extending into said bore.

10. A device for use with measuring instruments, as described in claim 1, wherein said device further includes
    means for mounting adapters for interposition between said device and a workpiece.

11. A device for use with meausuring instruments, as described in claim 1, further including:
    a plunger extension detachably mounted to said shoulder means.

12. In combination, a device for use with measuring instruments, including dial gauge indicators and the like which have a movable plunger, and an adapter for interposition between said device and a workpiece comprising:
    a body member having a bore therethrough receiving the plunger and further having an adjustment slot extending through at least one wall of said body member and communicating with said bore;
    means for mounting said body member to the measuring instruments;
    means for mounting said body member to the adapter;
    a sliding member carried by said body member over said adjustment slot; and,
    shoulder means engageable with said sliding member for supporting the plunger whereby movement of the plunger is limited to a fixed distance as determined by the position of said sliding member on said body member.

13. The combination of claim 12, wherein the adapter comprises:
    a bar having a relatively broad, flat surface;
    a leg extending from a surface opposite said flat surface and receivable within said bore in said body; and,
    a transversely extending bore in said leg and said bar.

14. The combination of claim 12, wherein the adapter comprises:
    an elongated barrel having a flat disc at one end;
    a longitudinally extending bore therethrough;
    a straight slot extending through one wall of said barrel and said disc and contiguous with said bore, said slot terminating before said opposite end of said barrel;
    a plunger extension detachably mounted to said shoulder means and movable within said longitudinally extending bore; and,
    a foot carried by said plunger extension reciprocable within said slot whereby measurements may be taken on a workpiece between said disc and said foot.

* * * * *